United States Patent [19]

Möbius

[11] Patent Number: 4,497,425
[45] Date of Patent: Feb. 5, 1985

[54] CARRIER ARRANGEMENT

[76] Inventor: Ulrich Möbius, Fraunhoferstrasse 45, D-6450 Hanau (Main), Fed. Rep. of Germany

[21] Appl. No.: 374,892

[22] Filed: May 4, 1982

[30] Foreign Application Priority Data

May 7, 1981 [DE] Fed. Rep. of Germany ... 8113476[U]

[51] Int. Cl.$^3$ ................................................ B60R 9/04
[52] U.S. Cl. ................................... 224/324; 224/319; 224/322
[58] Field of Search .............. 224/917, 309, 324, 316, 224/319, 322, 315, 325, 326, 327, 329, 330; 280/769; 296/37.7; 248/206 R, 362, 363, 359.1

[56] References Cited

U.S. PATENT DOCUMENTS

| | | | |
|---|---|---|---|
| 2,434,387 | 1/1948 | Brandt | 224/324 X |
| 2,720,350 | 10/1955 | Felton | 224/917 X |
| 2,833,453 | 5/1958 | Barreca | 224/917 X |
| 2,886,271 | 5/1959 | Williamson | 224/309 |
| 2,936,926 | 5/1960 | Miller | 220/85 K |
| 2,988,253 | 6/1961 | Menghi | 224/324 X |
| 3,006,519 | 10/1961 | Doane | 224/316 X |
| 3,208,173 | 9/1965 | Shank | 224/324 X |
| 3,542,264 | 11/1970 | Meyer | 224/326 X |
| 3,623,642 | 11/1971 | Stephen | 224/325 |
| 3,719,297 | 3/1973 | Nowicki | 224/324 X |
| 3,848,785 | 11/1974 | Bott | 224/319 |
| 3,897,895 | 8/1975 | Read | 224/917 X |
| 4,015,760 | 4/1977 | Bott | 224/324 |
| 4,101,061 | 7/1978 | Sage et al. | 224/322 |
| 4,326,655 | 4/1982 | Gradek et al. | 224/324 |

FOREIGN PATENT DOCUMENTS

| | | | |
|---|---|---|---|
| 2638505 | 3/1978 | Fed. Rep. of Germany | 224/324 |
| 2933915 | 3/1981 | Fed. Rep. of Germany | 224/316 |
| 1476597 | 5/1966 | France | 224/309 |
| 61014 | 6/1939 | Norway | 224/324 |
| 2048802 | 12/1980 | United Kingdom | 224/329 |

Primary Examiner—Stephen Marcus
Assistant Examiner—Robert Petrik
Attorney, Agent, or Firm—Cushman, Darby & Cushman

[57] ABSTRACT

A vehicle roof carrier includes at least one elongated carrier member transversely mounted on the roof of a vehicle. In one embodiment, the carrier member defines a slit longitudinally extending between the opposing ends of the carrier member and has at least one enlarged area in communication with the slit. Plural mounting members each of which define an aerodynamically-sound forward surface are retained in the carrier member by a retaining clip. The retaining clip is generally U-shaped in configuration and includes terminal legs having engagement members which are registrable with the enlarged area. Furthermore, the mounting members define recessed surfaces so that when the retaining clip is positioned in the slit of the carrier member, the horizontal leg of the retaining clip will be seated in the recessed surface of each mounting member to thereby retain them in a predetermined position on the carrier member. As such, the mounting members can be positioned so that they either form a contiguous, monolithic appearance or can be separated from one another so as to define a space therebetween for carrying elongated goods, such as, skis or the like.

27 Claims, 10 Drawing Figures

CARRIER ARRANGEMENT

BACKGROUND AND SUMMARY OF THE PRESENT INVENTION

The present invention relates to a carrier arrangement for receiving goods to be carried on the roof of a motor vehicle. The present invention more particularly includes two carrying members being arranged at a distance from one another and laterally with respect to the car roof. The carrying members are preferably fixed laterally onto the car roof cappings and/or car roof canals, respectively.

Conventional carrier arrangements known from practice are composed essentially of carrying bows, which offer considerable flow resistance during vehicle movement. Also, due to the distance between the car roof and the carrier, such conventional carrier arrangements will cause turbulences that can result in a lifting of at least the roof carrier so that normal travel speeds, as compared to vehicles without such carrying bows, cannot be maintained for safety reasons.

In order to reduce flow resistance during movement of the vehicle a suggestion has been made in the art to cover the respective carrying bows so as to improve the aerodynamics thereof. However, the covering in accordance with such prior art suggestion is not intended for carrying weight.

Also, since such carrying bows are typically covered at a later time, this will result in the disadvantage that they must be specially adapted to a particular car type or to a particular carrying bow size in order to obtain the desired reduction of flow resistance. Very often the covering will also terminate above the car roof thus making it impossible to stop the undesired turbulences and the wind noises being incidental thereto.

It is the object of the present invention to provide a carrier arrangement of the kind as mentioned above having simple construction without any additional covering so that the flow resistance of the carrier arrangement during movement of the vehicle will be considerably reduced. Furthermore, it is an object of the present invention to prevent the airstream from flowing underneath the carrier arrangement so that travel speed reduction will not become necessary. Moreover, the construction of the present invention is also easy to manufacture, does not require much maintenance during its service, and prevents damages to the carrier arrangement by corrosive attack. The carrier arrangement of the present invention is aesthetically attractive so that the general appearance of a motor vehicle equipped with the carrier arrangement is not essentially impaired. In addition thereto, mounting of a carrier arrangement of the present invention can also be accomplished on motor vehicles which do not have a roof canal.

According to the present invention, the above objects are achieved by providing a pair of carrying members which are composed of a body resting on the car roof either indirectly or directly. The body on the side of the oncoming stream of air is ascendingly sloped starting from the car roof to reduce the resistance to air flow thereacross. In other words, the covering end on the roof side and on the side of the oncoming airstream is preferably wedge-shaped. Further, the carrying member preferably can also be provided as a cup-shaped hollow body open to the roof side, of which the surface on the side of the oncoming airstream to the motor vehicle defines an angle greater than 0. In such a manner, a spoiler-like shape is obtained.

According to the present invention, a carrier arrangement is provided which has abandoned the concepts of conventional carrying bows and has completely replaced them by plastic bodies. The flow resistance of a motor vehicle having the carrier arrangement according to the invention is reduced as compared to conventional carrier arrangements due to the bodies' spoiler-like design. Since the carrying members are tightly resting upon the car roof, it is guaranteed that the air during travel cannot flow underneath them so that turbulences and disturbing travel wind noises are excluded.

In addition thereto, lateral mounting on a bar can be provided due to the carrier elements resting directly on the roof which is not possible with conventional carriers or carriers having only expensive constructions when using carrying bows mounted a distance away from the roof. There is also the choice that the carrying members of the present invention can be fixed on the roof by means of countersunk nuts or thread bores, for example.

A surrounding rubber strip is provided at least along the front and lateral contact surfaces of the carrying members in order to guarantee a safe and rigid seat for the spoiler-like bodies. Also the strip can be mounted on a rubber plate or the like. By virtue of the rubber strip or the rubber plate, a suction effect is obtained relative to the car roof so that a perfect seat is guaranteed.

In one embodiment of the present invention, the carrying member is composed of a plate-shaped base member and in longitudinal direction of which is preferably defined a slit into which members of an aerodynamically sound configuration can be placed with their surfaces facing the oncoming airstream. Furthermore, supporting means for baggage grids, bicycle carriers, trunk boxes, surfboard supports or the like, can be provided so that the base member has its surface facing the roof of the motor vehicle while at least its front and side regions have a strip covering the front and lateral edges of the base member.

Thus, the present invention with its base member resting on the car roof and provided with a rubber strip covering its front and lateral edges affords a body-adaptable roof plate which produces only minimum airstream resistance. Moreover, the present invention is not readily visible since a smooth surface is defined between the car roof and the base member so that no visual interruption (as is the case with conventional carrier arrangements) occurs. Thus, a conscious perception of the carrier arrangement of the present invention is not established.

The base member is the initial structure upon which baggage grids, bicycle supports, trunk boxes, surfboard carriers or the like are mounted. In order that these members will not cause any negative influence on the air flow, members of aerodynamically sound configuration are detachably mounted on the base members. Thus, such aerodynamic members together with the base member and the surrounding rubber strip will define a wedge-shaped form. This will result in the aerodynamics being extremely stream-sound and thus will minimally influence the travelling behavior of a motor vehicle.

Regardless of whether the carrying member is composed of a single homogeneous body with a rubber strip or of a base member with rubber strip members of aerodynamically sound configuration mounted thereon, the body or the base member can be fastened on the car roof either indirectly or directly (with or without the rubber strip) by means of fastening devices projecting laterally from the body or the base member, respectively, and being displaceable relative thereto. Thus, such fastening devices like hooks or claws for the load-carrying support in the lateral region of the car roof are provided and are preferably connected to one another by a pulling means, such as a tackle or a rod mechanism which is disposed inside the body, so that the distance of the fastening devices can be adjustable for adapting them to various car roofs by changing the length of the pulling means. This embodiment offers the advantage that an adaptation to different fastening places is possible for different vehicle types without changing the outer dimensions of the body or base member. Of course, the respective fastening devices should be made displaceable relative to the lateral faces of the body. In order to increase or decrease the distance between the fastening devices, one merely needs to shorten or lengthen the pulling means. As the load transfer takes place on the reinforced lateral region of the car roof, the direct resting of the carrier upon the car roof will not deform the roof.

Preferably, the fastening devices are hinged to the pulling means exterior of the body or base member so that the pulling means can be manipulated to provide rough adjustment of the distance between the fastening devices. To permit such adjustment, first sections are movable against each other, of which one of the first sections includes projections while the other defines matching recesses. Precise adjustment of the fastening devices can be established by second sections which are preferably connected to one another by means of a counter-threaded sleeve. Thus, since the fine adjustment structures limit the torque, safe mounting on the car roof can be made without any resulting risk of deformation of the motor vehicle.

The connection between the pulling means and the fastening means is articulated and thus guarantees in case of an accident that a sufficient force absorption will take place in this region so that the risk of unintended detaching of the carrier arrangement from the roof of a motor vehicle is practically impossible.

The simple mounting of the carrier arrangement is therefore guaranteed by the pulling means having rigid sections being provided with the above-mentioned projections or recesses, respectively. The projections are displaceable along the recesses in one direction only and thus when the pulling means is shortened during rough adjustment, a desired distance between the fastening devices can be obtained and consequently adaptation to the respective width of the car roof is provided.

After rough adjustment is established, fine adjustment of the pulling means can be made by manipulation with a tool of a counter-threaded sleeve. Since the pulling means is disposed inside of the body or the base member, the tool can be inserted through a slit defined in the body or base member, respectively. In order to prevent theft, the tool can have a special form and consequently the slit will also be of special form so that no access to the counter-thread sleeve is premitted with normal tools and/or wrenches. The counter-threaded sleeve, of course, can be replaced by any other suitable means with equal function.

If the base member is an integral body with a rubber plate or rubber strip arranged on the face thereof, the body is then provided with several recesses for accommodating goods and/or supporting means for the goods. The recesses are preferably configured like slits, funnels, cones, or the like so that skis, for example, can be directly mounted therein. According to another embodiment, adapters can be placed in the recesses to serve as fastening means for e.g. baggage grids, surfboard carriers, bicycle supports or trunk boxes. Thus, one need only install the proper adapters in order to mount the required holding means for the objects to be transported.

Due to the spoiler-like configuration of the carrier as well as the direct resting thereof on the car roof, there is the further advantage that e.g. ski bindings projecting between the carrying means are largely protected during transport so that additional protective devices are not required. This feature is due to the fact that the region between the holding means is sheltered from wind.

In order to furnish safe fastening of the adapters or of objects directly placed into the recesses like skis for example, a locking device, preferably a rubber-metal tube-bow or a similar tubular member, is provided above the top region of the bodies. Preferably, the locking member is provided with a lock and key. In this regard, the locking device, on its free end, includes a projection insertable into the body and capable of being locked therein by means of a cylinder block. In addition thereto, the projection can be placed into a recess provided in the fastening means thereby providing an additional safeguard against theft. As an alternative, the locking device can also be composed of two sections linked in the center or substantially in the center of the top region of the body and to which the free ends thereof can be fixed, preferably with lock and key, in the respective rim regions of the body.

In an embodiment of the present invention, a member having a U-shaped profile is imbedded in the base member for forming a slit wherein the free ends of the legs face each other. The slit is enlarged preferably in the region of the ends. One can then place the fastening means into the slit for baggage grids, surfboard supports or the like, as well as the mounting members of aerodynamically sound configuration having projections on the bottom surface so that lateral travel in the slits is initially permitted. The projections are designed in such a manner that removal is possible only in the region of the slit enlargements. As an alternative thereto, the projection on the bottom face can, of course, be pivoted by means of a mountable tool. Thus, the projection can assume two positions; e.g. in the first position the U-shaped member cannot be removed from the slit, whereas in the other position mounting or removal is possible.

The mounting members with respect to each other, can be arranged in such a manner that they will contact each other and thus several mounting members will form a continuous unit. Alternately, the mounting members can be arranged at a distance relative to each other. The latter arrangement is an advantage if skis, for example, are to be transported in the space formed therebetween so that additional holding means will not be required.

According to a further embodiment of the present invention, the mounting members can be covered with at least one retaining clip. The clip is preferably U-shaped and on its free legs defines foot ends which approximately correspond to the dimension of the slits in their respective enlarged regions. This foot end section is followed by a tapered section in order to enable the cup to travel longitudinally along the slit. In other words, the foot end must first be inserted in the slit enlargement and moved in the direction of the bottom of the profile material in order to permit subsequent longitudinal displacement of the clip.

Preferably, two such retaining clips sequentially are provided to span the mounting members. The vertically extending legs on the inner surface relative to the slit are preferably hinged to the remaining parts of the clip. This has the advantage that one leg of the clip can remain anchored in the slit, in order to permit removal of e.g. skis while the other leg is pivoted away to permit access to the skis. The angular adjustment of the horizontal and outer vertically disposed leg should be established by a prestressed spring so that a bias force will be exerted to only permit an angular adjustment of 45 so that the outer leg can be grasped and anchored again without any difficulties.

In order to make the carrier theft-proof and equip it with only one lock, in a further embodiment of the present invention the slit enlargements are arranged at a distance inwardly to the ends of the slits so that the bows are displaceable into an end position of the slit in such a manner that only one of the slit englargements is accessible. A cylindrical lock can then be inserted into the accessible slit enlargement. In other words, the cups are moved in the slit in such a manner that after locking one of the slit enlargements, the cups cannot be further moved so that the foot ends cannot be removed from the other slit enlargement.

To provide the mounting members with an aerodynamically-sound configuration, the mounting members are each wedge-shaped in cross section. The surface on the side of the oncoming air (front) is convex while the rear surface thereof is composed of two convex and/or almost rectilinear or rectilinear partial surfaces. The transition (in the form of steps) is horizontal or almost horizontal sections into which the horizontally disposed leg of the clip can be placed.

As least at the front and lateral edges of the carrier are surrounded by a rubber strip. The respective front and lateral edges of the body or base member is steeply ascending starting from the horizontal and at an almost parallel position relative to the outer section of the car roof. The corresponding rubber strip, toward the roof side has an arched bottom surface for providing a suction effect, a front (longer) leg and a rear (shorter) leg. Thus, the outer surface of the rear leg is steeper than the outer surface of the front leg. Further, the legs terminate in a center region and define a hollow space so as to obtain a prestress in direction to the base member or the body. By the special design of the rubber strip, it is guaranteed that when the carrier rests upon the roof of a motor vehicle, it is practically immoveable. The legs and the center region defining the hollow space act as a shock absorber and thus it is guaranteed that the rubber strip itself will stabilize the carrier arrangement from forward movement upon impact of the vehicle so that it will not be dislodged therefrom.

Further, the body or the base member can be cuplike hollow bodies which are preferably made of fiberglass-reinforced plastic. There is also a possiblity that the body or the base member can be permanently fixed onto the roof by screws.

In accordance with the present invention, a novel carrier arrangement is provided having only a minimal negative influence on the air resistance of a moving motor vehicle. Consequently, the driving comfort of a motor vehicle equipped with such a carrier will not be adversely affected. When compared to known roof carriers, the carrier arrangement according to the present invention will further result in energy savings and thus a reduction of fuel consumption. Moreover, the carrier arrangement of this invention can be mounted on motor vehicles which do not have any gutters or overlapping doors.

BRIEF DESCRIPTION OF THE ACCOMPANYING DRAWINGS

Further details, advantages and characteristics of the present invention will appear from the following description of preferred embodiments thereof, examples, and the attached drawings, wherein.

DETAILED DESCRIPTION OF THE PREFERRED EXEMPLARY EMBODIMENTS

Figure 1:
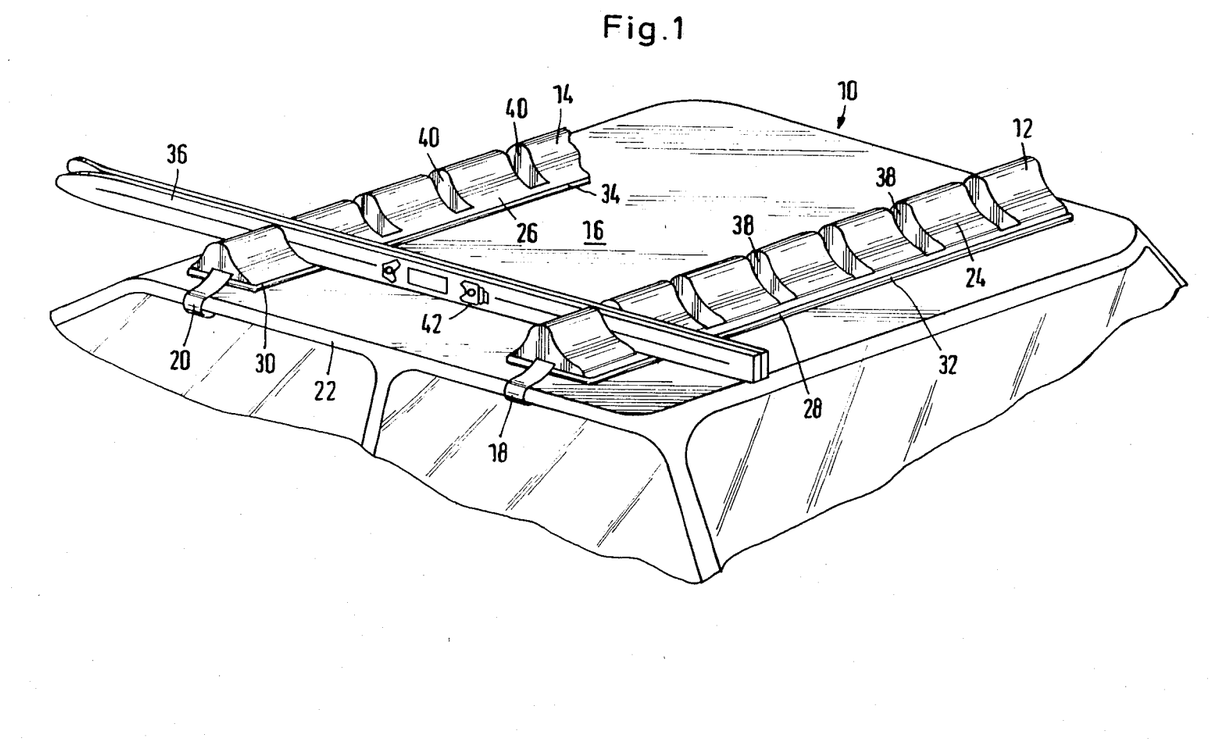
FIG. 1 is a perspective schematic view of an embodiment of a carrier arrangement according to the present invention.

FIG. 1 schematically shows a carrier arrangement 10, having front and rear carrying members 12 and 14, which are arranged so as to rest on a car roof 16 and connected to the lateral bars 22 of the motor vehicle by fastening devices 18, 20 each of which are configured like claws. According to this embodiment, the carrying members 12 and 14 are designed as cuplike hollow bodies open to the roof surface and are preferably made of a plastic material. Furthermore, carrying members 12, 14 are wedge-shaped on the side of the oncoming airstream for reducing the air resistance during travel and thus each defines a ramp-like upstream surface 24, 26, respectively. In other words, each upstream surface 24, 26 is essentially inclined at an acute angle relative to the car roof 16. Between the bearing edges or contact extremities 28, 30 of the carrying members 12, 14, respectively, (which in practice can also be designed as solid bodies or hollow bodies closed on the side facing the roof) and the roof surface 16 of the motor vehicle, there is preferably arranged a surrounding rubber strip 32, 34, to prevent damage due to members 12, 14 resting on the car roof 16. At the same time, the hollow members 12, 14 are thus acting as a suction means whereby an additional stabilization and nonskid property is established. In order to be able to transport articles such as skis 36 as indicated in the drawings by means of the carrier arrangement 10, carrying members 12, 14 are provided with recesses 38, 40 formed therein like slits and arranged along the carrying means in the longitudinal direction of the motor vehicle. Thus, the slits 38, 40 preferably extend into the region of the bearing edges 28, 30. If the skis 36 are then placed in coordinated recesses 38, 40, then not only can a safe transport thereof be guaranteed but at the same time the ski-binding 42 positioned between the carrying means 12 and 14 is thus protected against the air flow so that additional protective measures need not be taken.

Due to the spoiler-like design of the members 12, 14 and the direct resting thereof on the car roof 16, it is guaranteed that the air resistance during travel is reduced as compared to roof carriers having conventional carrying bows. Moreover the air can no longer flow underneath the members 12, 14 thus preventing undesired lifting thereof and/or a generation of air turbulences. Also due to the compact arrangement 10, which rests directly on the car roof 16, the stylistic design of a vehicle equipped in such a manner will remain unchanged to a greater extent so that even when looking at it from an aesthetic point of view, the arrangement according to the present invention offers an attractive appearance.

Figure 2:
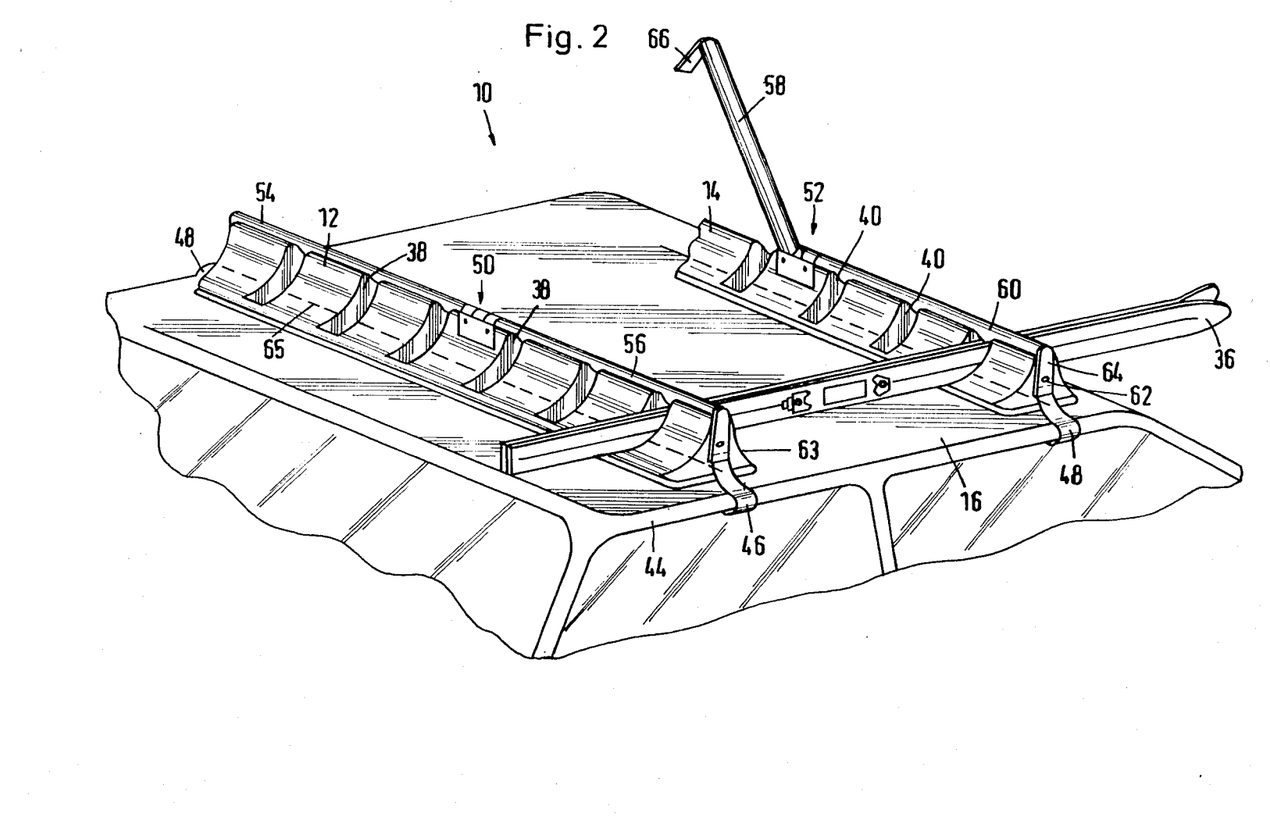
FIG. 2 is a further embodiment of the carrier arrangement according to FIG. 1.

In the embodiment according to FIGS. 1 and 2, skis are placed in respective pairs of slits 38, 40. However, in another embodiment of the present invention, adapters can be provided which serve as initial fastening means for e.g. ski boxes, baggage grids, surfboard holders, bicycle racks or trunk boxes. Consequently, by means of the carrier arrangement 10 according to the present invention, a basic component system is made available which can be easily re-equipped and/or adapted to any desired transport requirements without having to change the advantageous aerodynamics of the carrier arrangement.

From the embodiment according to FIG. 2, further constructions of the carrier arrangement 10 according to the present invention will become apparent, wherein like structure shown in FIG. 2 and described in connection with FIG. 1 will be indicated by the same reference numbers.

The spoiler-like members 12, 14 are attached to bar 44 of vehicle roof 16 by means of fastening devices 46, 48, respectively. In addition, locking means 50, 52 are provided at the top region of members 12, 14 and each includes two rubber-metal tube-bows 54, 56 and 58, 60, respectively, arranged in the center relative to the members 12, 14. In order to be able to place adapters (not shown) or the skis 36 into paired recesses 38, 40, the rubber bows 54, 56 and 58, 60 are folded upwardly so as to provide access to recesses 38, 40 in members 12, 14. Subsequently, the bows can be folded back into engagement with the members 12, 14 and can be locked in such position by means of cylinder block 62 so as to provide theft-proof transport of the objects placed in the bodies 12, 14.

For convenience, the theft-proof catch of the locking means 50, 52 will be explained only in connection with bow 60 of member 14. Thus, at the free end of the bow 60, a flange projection 64 is disposed in such a manner that in its rest position on member 14, penetration of cylinder block 62 occurs so that the cylinder block 62 can catch and hold it. Preferably, the flange projection 64 at the same time will interact with the fastening means 48, so that when the bow 60 is secured, it is likewise impossible to remove hook 48. Thus, the carrying member 14 itself is secured against unauthorized removal.

A further preferred embodiment of the carrying means according to the invention is illustrated especially in connection with the member 12 of FIG. 2. As shown, the fastening devices or hooks 46 and 48 are connected to each other via a pulling means 65, of which the length can be changed by a stretching means such as a counter-threaded sleeve (see FIG. 6). This structure provides the advantage that the members 12, 14 according to the present invention can be mounted on the roofs of motor vehicles of different sizes without necessitating a modification of their construction. If the distance between the hooks 46, 48 needs to be increased, one merely needs to lengthen the pulling means 65 by manipulating the counter-threaded sleeve (see FIG. 6) in order to guarantee safe mounting. The stretching means is preferably accessible via a recess 38, 40 in order to ensure that the object placed therein for transportation (in this embodiment for example, the skis 36) will not be unintentionally removed to thus provide an additional theft proof capabilities.

Further, it should be noted that locking means 50, 52 are provided so that they can be placed in concave recesses which are preferably arranged in the head region of the carrying members 12, 14, in order to enable secure guiding and fixing thereof. At the same time, a continuous surface between the upstream surface of the members 12, 14 and that of the locking means can be established so that the aerodynamically sound form is maintained.

Member 12 according to the FIG. 2 embodiment further has a drawn-in back wall surface 63 serving as a wind-breaking edge to guarantee that the airstream will not enter the inside of the motor vehicle to a disturbing extent in event that an existing sunroof is open.

FIGS. 1 and 2 depict an embodiment of the carrier arrangement 10 according to the present invention which is defined by members 12, 14 of aerodynamically sound design which rest directly on the roof by virtue of rubber strip 30. The embodiments shown in FIGS. 3 to 9 however relate to alternatives of special interest. In the FIGS. 3-9 embodiments, each carrying means comprises a plate-shaped base member 68 having a housing member 94 extending in the longitudinal direction. Housing member 94 preferably defines a longitudinal slit 96 into which hump-like members 72 of aerodynamically sound configuration can be detachably mounted. The base member 68 on its front and lateral border 112 includes a surrounding rubber strip 70, the design of which will be described in more detail in connection with FIG. 8 below. The rubber strip 70 and the plate-shaped base member 68 are called a body-adaptable roofplate and consequently establish the base for the carrier arrangement of the present invention. Together, the base member 68 and rubber strip 70 will only negligibly influence the airstream resistance of a motor vehicle due to their small overall height. Moreover, member 68 and strip 70 will be visually unnoticable and this effect can even be further improved by matching the color of the base member 68 to that of the motor vehicle.

Figures 3, 3A:
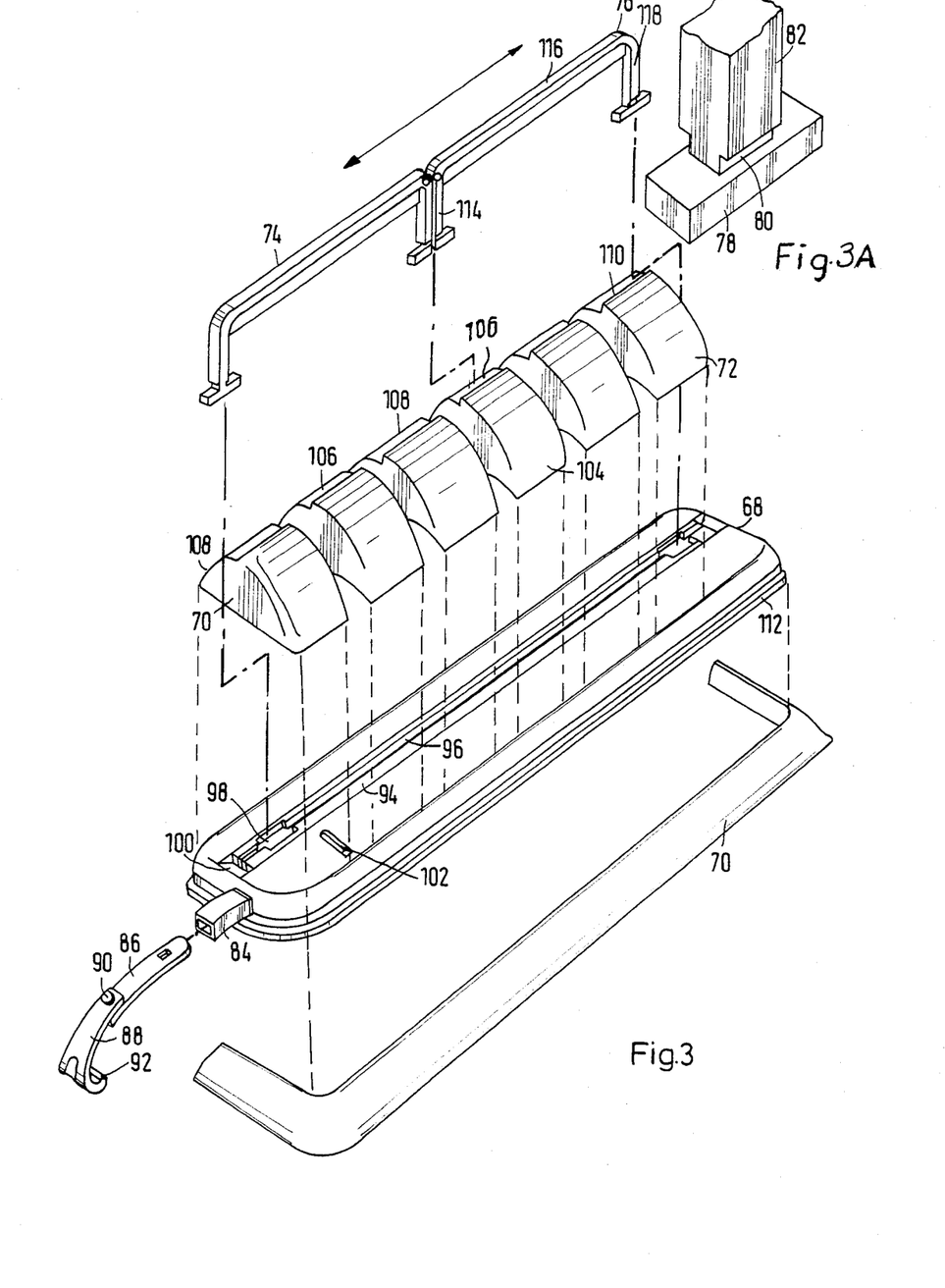
FIG. 3 is an exploded view of another embodiment of a carrying arrangement of the present invention.
FIG. 3A is a detailed perspective view of a foot for the U-shaped clips shown in FIG. 3.

The base plate 68 is mounted on the roof of the motor vehicle by fastening means which project from the side faces thereof a predetermined distance to the car roof and are movable relative thereto so that the load-carrying support will take place in the lateral region of the car roof. In such a manner, the roof will not experience deformation or bending despite the base member 68 resting directly thereon. Moreover, mounting on a roof made of plastic or acrylglass is now possible without any risk of damage.

The fastening means essentially include a hook or claw-shaped outer member 88 having a free end 92 which can link with a bar (not shown) or a roof canal of a motor vehicle. The hook 88 has attached thereto a flexible connector 86 which can also be rigid if desired. Guide 84 on the sides of the base member 68 accepts and holds connector 86 therein. Moreover, connector 86 can be stretched therein by means of adjustment means which will be explained below in connection with FIG. 6.

The hinged joint 90 permits rotation between the hook 88 and the connector 86 and offers the advantage that in case of an accident, force absorption in the region of the joint will take place in such a manner that the hook 88 will not become dislodged.

In order that the base member 68 can support loads without essentially influencing the aerodynamics and thus can carry baggage grids, bicycle racks, trunk boxes or surfboard holders, plural members 72 of aerodynamically sound configuration are placed in slit 96. Slit 96 is part of the housing arrangement 94 which is embedded in the base member 68 and is preferably composed of a U-shaped profile material with the free ends of its legs facing each other. Further, it can be seen that in the outer border regions of the housing arrangement 94, an enlargement of the slit 98 is provided, the function of which will be described in more detail below.

Members 72 can be detachably mounted in the slit 96 and can either be positioned so as to be contiguous or spaced apart at a distance between each other. If the members 72 have a distance between each other, this distance can be selected in such a manner that goods such as skis can be arranged in the space defined between adjacent sides of members 72.

Members 72, preferably of wedge-shaped cross section, each defines a convex surface on the side of the oncoming airstream, which surface establishes two rear areas 108 and 110 being staggered relative to each other. Areas 108, 110 can likewise be convex, straight lined or almost straight-lined. The connecting surface between the areas 108, 110 is preferably a horizontally extending step 106. In this context it should be noted that the members to be arranged on the front or rear base member should not be of identical design. A horizontal leg 116 of U-shaped clips 74, 76 is disposed along step 106 in order to guarantee on the one hand immobility of members and, on the other hand, to secure against unauthorized removal the skis or the like goods which have been placed in the spaces between adjacent ones of members 72.

U-shaped clips 74, 76 include foot ends 78 which are configured so as to approximately correspond to the slit enlargements 98. In other words, the foot end 78 is insertable into the slit enlargement 98 and can then be moved towards the bottom of the housing arrangement 94 so that travel along the slit 96 can be effected. For this purpose the foot end 78 defines a taper region 80. Consequently the depth of the taper region 80 is equal to the width of the slit 96 and the height of the taper region 80 equals approximately the thickness of the profile material which establishes the slit 96. The taper region 80 is followed by a vertically extending leg 82 of the U-shaped clips 74 or 76. In the enlarged view of FIG. 3 this vertically extending leg has been generally designated by the reference number 82 and corresponds to the leg 114 or 118.

The plural members 72 and the clips 74, 76 are mounted in the following manner. The foot end of the vertically extending leg 114 is first placed into the slit enlargement 98 and moved along the slit 96. Subsequently, members 72 which have projections (not shown) on their base (bottom) area can be pushed into the housing arrangement 94 in such a manner that unintended removal thereof is not possible. After the members 72 have been mounted at the desired distance apart from one another, the foot end of the outer vertically extending leg 118 can be inserted in the slit enlargement 98 so that the horizontally extending leg 116 will rest on the horizontal section or steps of the members 72. Thereafter, the clip 76 can be moved in a direction towards the outer end of the housing arrangement 94 so that the foot end 114 is no longer in alignment with the slit enlargement 98 and consequently removal of the clip 76 is impossible.

As illustrated in FIG. 3, two clips 74 and 76 are provided for fastening the means 72. Of course, a single bow can also perform the same function.

As soon as the clips 74 and 76 have been fixed with respect to the members 72 which they must span, the clips 74, 76 according to the indicated arrow, can be moved to the right or to the left in slit 96. The longitudinal extension of the clips 74 and 76 is chosen in such a manner that when an end position is reached (i.e. when the left vertically extending leg of the clip 74 and its respective foot has been moved completely to the left or when the foot of leg 118 has been completely moved to the right), on the one hand the clips 74, 76 can no longer be removed from the slit 96 and, on the other hand, the slit enlargement 98 adjacent each end position is accessible so that it can be provided with a lock, for example. Thus, to secure the load or the load carrying means mounted on the base member against theft, only one locking device such as a lock is required for each carrying means, whereas the conventional carrying means typically requires a locking device on each side thereof.

Of course, in order to obtain this advantage it is necessary that the change of distance of the flexible connector 86 and hook 88 projecting from the side faces of the base member 68 can only be made if the pulling means (not shown in FIG. 3 but explained in more detail in connection with FIG. 6) is adjustable by reciprocal action with a tool that can be inserted into the interior of the base member 68. In the embodiment of FIGS. 3-9, this is accomplished through a slit 102 being covered by one of the members 72 in its final mounted position relative base member 68 by virtue of the clips 74 and 76. Further, it should be noted that the tool for adjusting the pulling means is preferably of a special design and consequently the slit 102 is shaped in adaptation thereto so that the pulling means cannot be manipulated with standard tools to thus provide theft deterrance even if no member 72 is mounted thereon. Likewise it is possible that the members 72 should not be completely inserted into the housing arrangement 94 via the slit enlargement 98. This function can be achieved by providing ramp-shaped passages 100 defined by recesses in the base member 68 adjacent to the outer ends of the housing arrangement 96.

Figure 4:
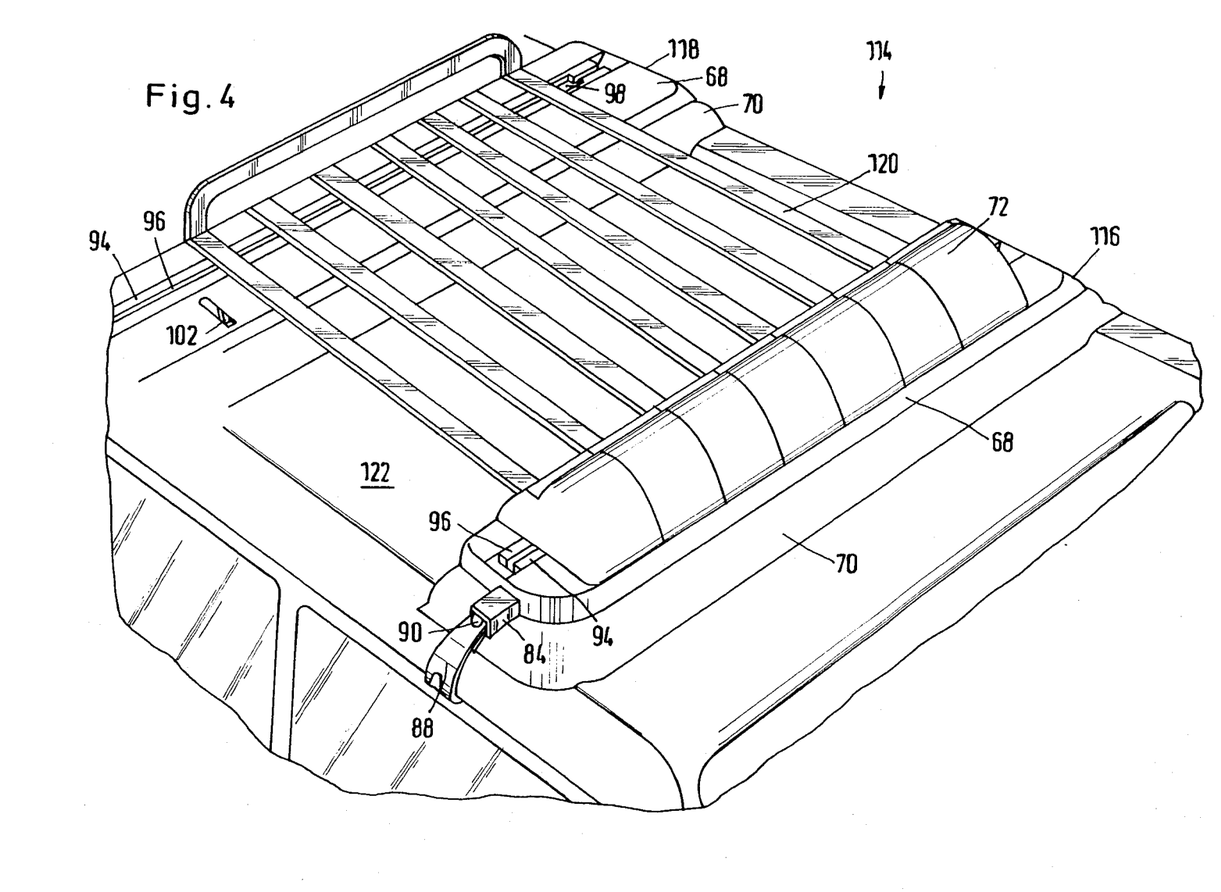
FIG. 4 is a carrier arrangement by using a carrying members according to the FIG. 3 embodiment.
Figure 9:
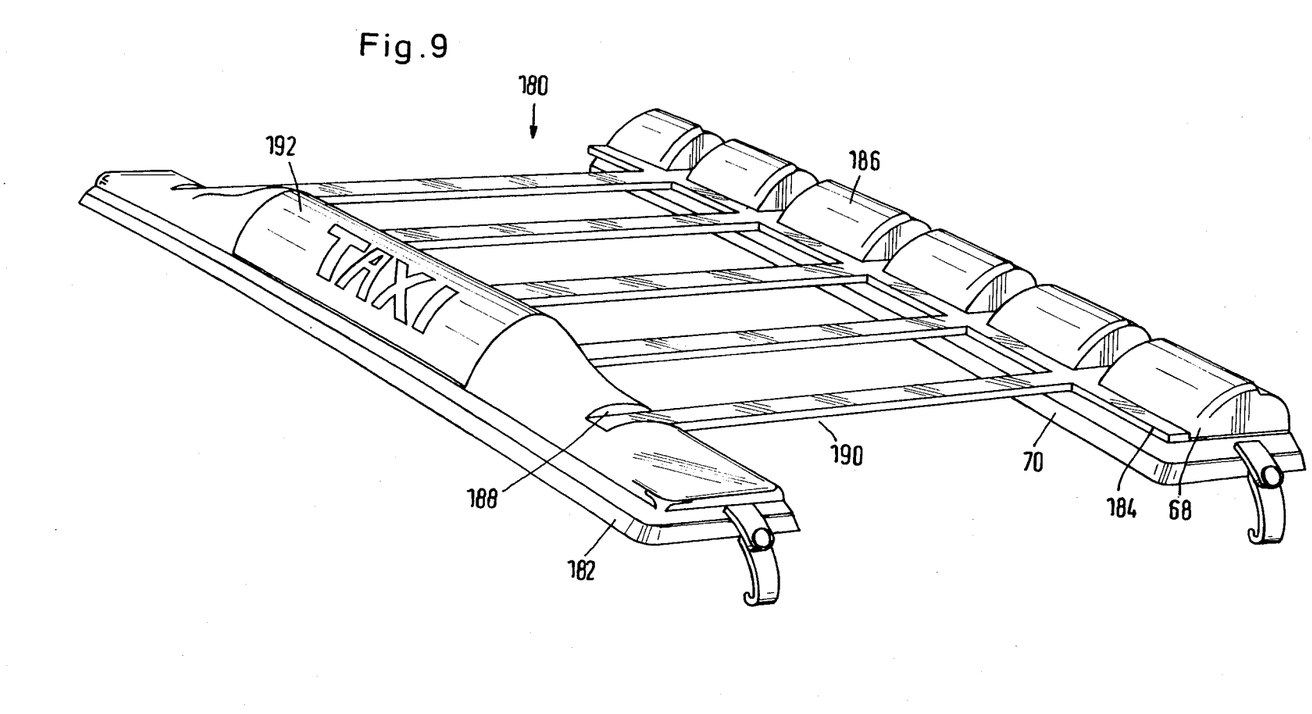
FIG. 9 is a perspective view of a form of application of a carrier arrangement according to the present invention.

Concerning the following description of FIGS. 4 and 9, it should be noted that relative to FIG. 3, the same structural elements are identified by the same reference numbers. FIG. 4 represents a schematic view of a carrier arrangement 114 which includes a front carrying element 116 and a rear carrying element 118. Each carrying element 116, 118 is provided with a superstructure as described in FIG. 3. The same is applicable with respect to the fastening on the roof of the motor vehicle 122. Thus, the hooks or claws 88 back-grasp the lateral bars or edges of the roof 122.

In the FIG. 4 embodiment, the carrier arrangement 114 serves as a receptable for a baggage grid 120. To this end, projections (not shown) engage the slits 96 of the housing arrangement 94. In addition thereto the front carrying element 114 is provided with the members 72 of aerodynamically sound configuration so that a negative influence on the aerodynamics of the baggage grid 120 and, eventually, the good lodged therein is not established. For this purpose, the members 72 on the front base member are arranged contiguously adjacent to each other (and thus are not spaced apart relative to each other) so as to define an endless or monolithic surface. That is, the base member 68 together with its enclosing rubber support 70 and the members 72 will approximately define a body as has been described in connection with the embodiment of FIGS. 1 and 2. The rear carrying element 118 in the view of FIG. 4 is not provided with the members 72, but it should be understood that respective members similar to members 72 can be provided therewith if deemed desirable or necessary. Of course, such similar members arranged on the carrying element 118 should not be identical to those of the front members 72. It is likewise apparent from the view of FIG. 4 that the slit 102 defined in the front base member 68 for adjusting the fastening means 88 is covered by an element 72, whereas the slit 102 provided on the rear base member 68 is unobstructed. However, this is not a danger spot for theft since, on the one hand, the front carrying element 116 is theft-proof and, on the other hand, as mentioned before, the slit 102 is preferably of special configuration so that a standard tool cannot be inserted therein.

Figure 5:
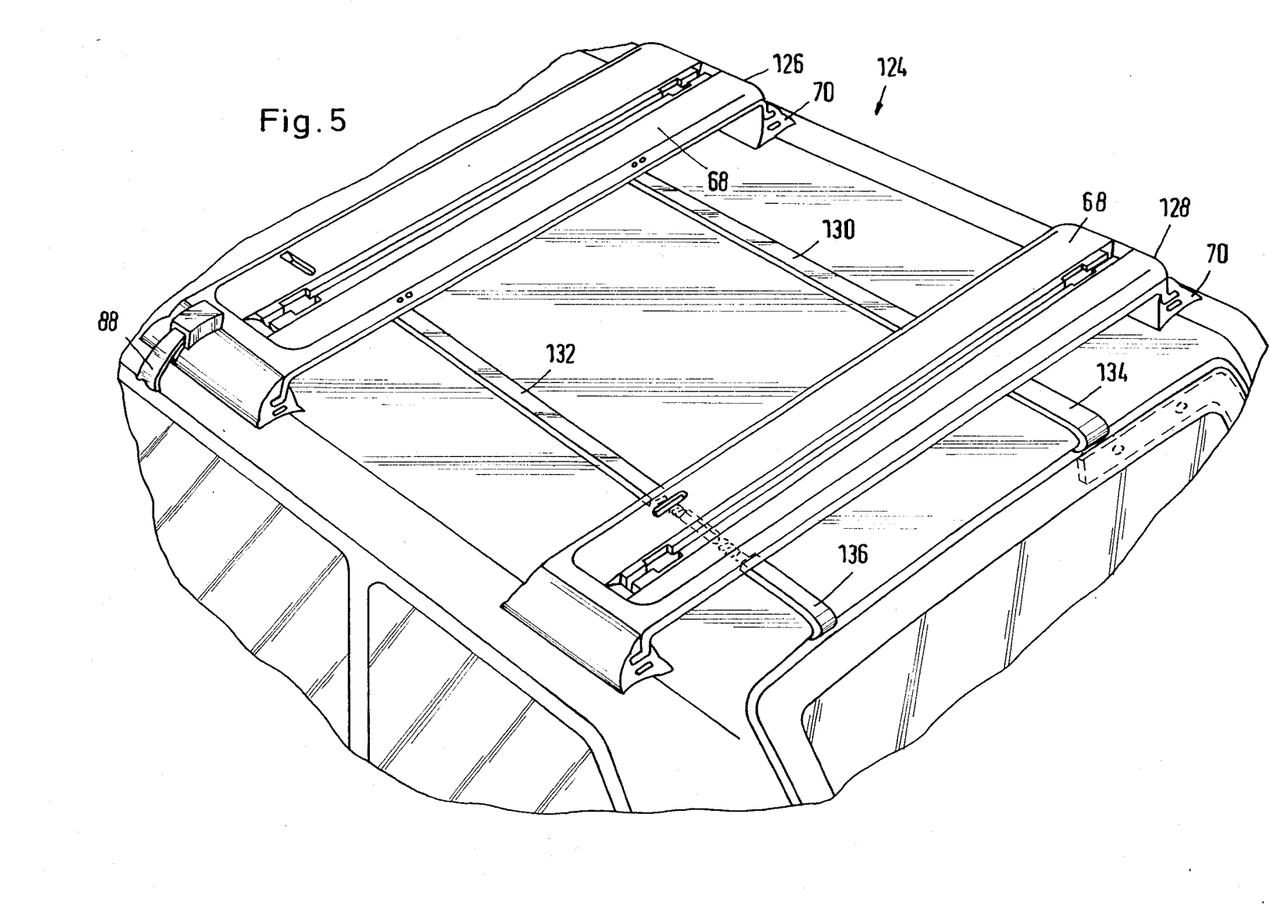
FIG. 5 is a modified carrier arrangement with carrying members according to the FIG. 3 embodiment.

FIG. 5 shows a carrier arrangement 124 which is intended for a passenger car with two side doors and which does not have roof canals. Thus, the hooks 88 must embrace the roof edges. It follows then that only the front carrying element 126 can be fastened on the roof of the motor vehicle in a manner as has been described in connection with the embodiment of FIGS. 3 and 4. According to the embodiment of FIG. 5, the rear carrying element 128 is connected with the front carrying element 126 by bracings 130 and 132 running parallel to the longitudinal axis of the motor vehicle. Further bracings 134 and 136 extend into the tail region of the motor vehicle to be fastened there if a tail door is available, in the upper frame region of the tail door opening. The bracings 130, 132 or 134, 136 can likewise be connected via pulling means arranged in the inside of the base member so that ready adaptation to different types of cars is possible and so that the distance between the front and the rear carrying elements 126, 128, respectively, is freely adjustable. In all other respects the construction of the carrying elements 126, 128 is equivalent to that as shown in FIG. 3.

As the carrier arrangement 124 according to FIG. 5 is shown from the back, it is clearly visible that the base members 68 are of cuplike design by omitting the pulled-down rear edge. It can also be noticed that the rubber strip 70 encloses the pulled-down lateral edges and the front edge thereof. Among other things, this has the advantage that material saving will result without influencing the functional efficiency. Moreover, there is no closed hollow space underneath the base member 68 which eventually could lead to rust formation on the car roof in this area.

Figure 6:
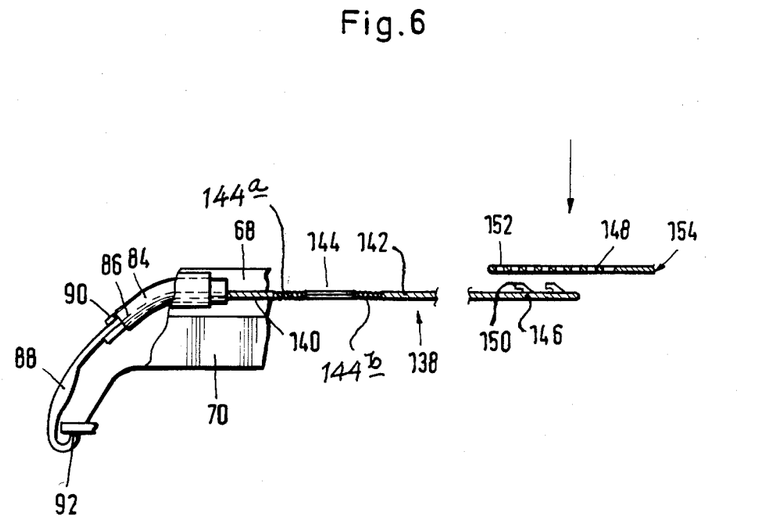
FIG. 6 is a detail view of a fastening device for a carrying arrangement of the present invention.

The fastening means required for mounting the base member 68 are shown in more detail in sectional view in FIG. 6. In this context it should be mentioned that the same fastening means, or course, can likewise be used for the embodiments according to the present invention shown in FIGS. 1 and 2 herewith.

It can be seen in FIG. 6 that the adjusting means 138 (having been mentioned before several times already) passes through base member 68 and is of rigid configuration on its front end. The ends of adjusting means 138 are led to the outside via the guide 84 and are connected to a respective one of hoods 88 which grasp the roof by their free ends 92. Further, the passage between the rigid part 86 of the adjusting means 138 and the hook 88 is the articulated joint 90 in order to enable the mentioned force absorption in case of an accident. The rigid section 86 is sequentially followed by flexible sections 140 and 142 being connected with each other via a screw socket 144. The flexible section 142 is then followed by rigid sections 146 and 148, of which the section 146 is provided with projections 150 and the section 148 with corresponding recesses 152. Section 148 can then again continue in a flexible section in order to end in a section corresponding to the section 86 described above. As an alternative, the right free end of the section 148 can be the outward projection section.

Sections 146 and 148 having registrable projections 150 and recesses 152 permit rough adjustment of the distance between the outward projecting hooks 88. To this end, section 148 must first be detached from the section 146 in order to obtain the proper rough distance between the hooks 88 that is somewhat greater than the fastening points on the roof of the motor vehicle. Subsequently, section 148 is moved in the direction of the arrow 154 so that the recesses 152 will register with the projections 150. Since the projections 150 are shaped like barbs, the section 148 can be moved in the direction of the arrow 154 without any resistance. Should section 148 be moved against the direction of arrow 154, the projections 150 will firmly catch in the recesses 152.

After a rough adjustment has been accomplished by cooperation of the sections 146, 148 respectively having the projections and recesses 150, 152, the final distance between the hooks 88 can now be adjusted by means of the counter-screw socket 144 connecting the threaded portions, 144a and 144b of flexible sections 140, 142, respectively. In order to make this possible, the counter-screw socket 144 is preferably manipulated by a wrench of special design, which can be inserted into the inside of the base member 68 or the members 12, 14 through the slit 102, which has already been mentioned in connection with the FIGS. 3 and 4 embodiment. The counterscrew socket should have a limit stop to the torque influence of the tool in order to exclude over tightening thereof which could cause eventual deformation of the roof of the motor vehicle.

By the construction of the pulling means 138 according to the present invention, the outward extending connector 86 and hook 88 and their articulated joint 90 are coupled together for easy handling. Moreover, an extremely functionally competent and safely working fastening means is provided for fastening the carrying means according to the present invention onto the roof of a motor vehicle.

Figure 7:
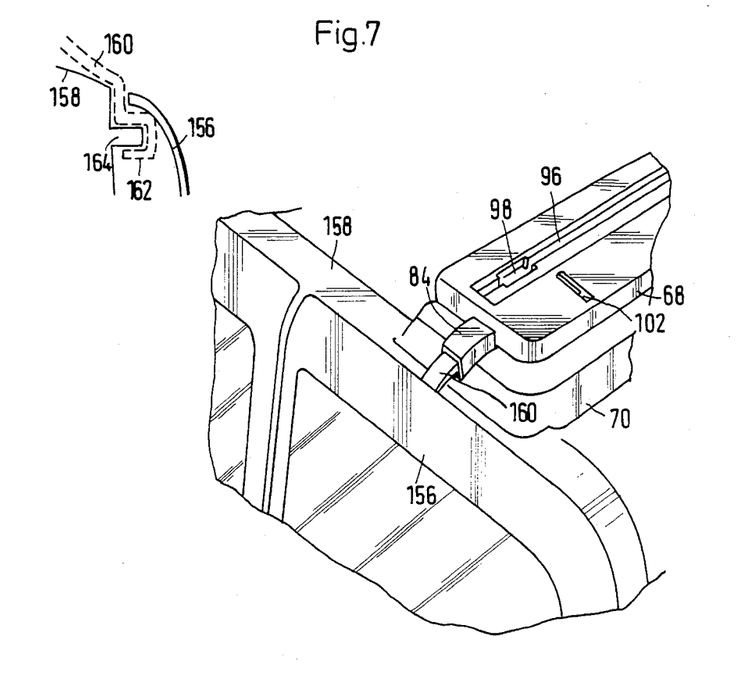
FIG. 7 is another detail view of the fastening device for the carrying arrangement of the present invention.

In order to use the carrier arrangement for motor vehicles having overlapping door constructions, the fastening means projecting from the base member 68 or the bodies 12 and 14 can be designed in such a manner as shown in FIG. 7. As can be seen from the detail view, a car door 156 and the adjacent frame 158, cooperate so that the upper end of the door 156 is continuously curved toward the roof 158 of the motor vehicle. In such a case, the kind of fastening as described in connection with FIGS. 1 to 6 would not be possible. However, in order to ensure that the carrier arrangement according to the present invention can be used for such motor vehicles, the free end of the fastening means 160 is designed in such a manner that preferably the free end will have a U-shaped groove into which a prjection 164 on the frame of the motor vehicle can be placed. Thus, firm support of the carrying means with the pulling means stretched is guaranteed without requiring any additional safety devices. By a suitable kind of fastening, there will be an additional safeguard against theft, since the fastening point is covered by the upper edge of the door 156 and thus not freely accessible.

Figure 8:
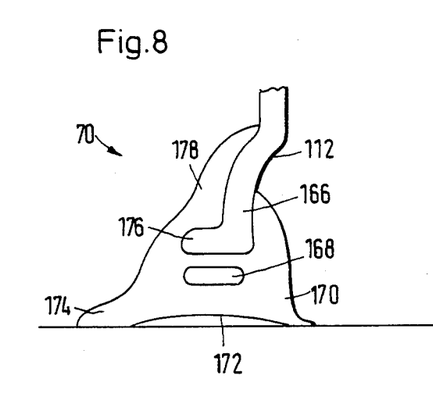
FIG. 8 is an enlarged view of a rubber strip surrounding the edge of the carrying arrangement.

FIG. 8 shows an enlarged view of the rubber strip 70 enclosing at least the lateral edges and the front edge 112 of the base member 68 or of the members 12 and 14, in order to more clearly illustrate the essential features of the invention.

Insertred edge 112 includes an outer section 176 which transforms into a steeply ascending section 166. The rubber strip 70 has a curved bottom region 172 terminating in a front leg 174 and a rear leg 170, front leg 174 being longer than rear leg 170. Due to the curvature of the bottom region 172, a suction effect is created thus improving the immobility of the rubber strip 70 in which the base member 68 or the members 12 and 14 are placed.

Further, the outer surface of the rear leg 170 is preferably made steeper than the wavy-shaped outer surface of the front leg 174. Between the curved bottom region 172 and the L-shaped recess for the edge 176 of the base member 112 there is also provided a hollow space 168 serving as a shock absorber. Finally, the front leg 174, in the region of the edge 112, has a reinforcement 178, which on the one hand conforms to the change in configuration of edge 112 from the horizontal to the vertical and, on the other hand, guarantees that the leg 174 will be prestressed in the direction of the edge 112. If there is then an increased force influence in the direction of the front leg 174 then the hollow space 168 brings about a force absorption and the hump-like reinforcement 178 resists such increased force thus eliminating the possibility that the edge 112 will slip out from the rubber strip 70.

Finally, in perspective view, FIG. 9 presents a further embodiment of a carrier arrangement 180 being essentially composed of those elements as shown in connection with FIG. 4. Here, however, the front carrier element 182 has an interchangeable part 192 designed as an indicating sign like "Taxi" or as advertising signs or the like. This interchangeable part 192 is likewise of aerodynamically sound configuration so that no negative influence will be exercised on the advantages achieved by the present invention, such as the advantageous aerodynamics, simple construction, as well as energy savings and thus fuel economy directly related thereto. Further, the front carrying element 182 is provided with slit-shaped recesses 188 into which parts of a baggage grid 190 can be placed. The rear carrying element 184 is equivalent in all respects to the construction of the FIG. 3 embodiment in that alongside of the base member 68 there are inserted the members 186, which correspond to the members 72. A distance is provided between the members 186 in order that the ends of the baggage grid 190 can be placed into the slit (not shown) of the base member 68.

In these embodiments the front carrying means 130 was given an outline of gentle ascent starting from the outside. However, it goes without saying that any other configuration can likewise be chosen that will provide the desired positive influence on the airstream.

By the illustration in FIG. 9 it is again demonstrated how various the fields of application are for the carrier arrangement according to the present invention. Although the above-described emobidments may only show a small sector of the field of application of the present invention, it should nevertheless be appreciated that modifications can be made thereto which modifications shall be accorded the broadest interpretation of the following claims.

I claim:

1. A vehicle roof carrier for accommodating goods to be carried on the roof of a motor vehicle, said carrier comprising:

at least one elongated carrier member having upper and lower surfaces and opposing ends and adapted to being mounted transversely on the vehicle roof to support the goods carried thereon, said carrier member including means defining a slit longitudinally extending between said opposing ends and having at least one enlarged area in communication with said slit;

mounting means associated with said at least one carrier member for mounting said at least one carrier member transversely on the vehicle roof;

plural mounting members each retained on said upper surface of said at least one carrier member at predetermined positions, each said mounting member defining a convexly curved forward surface to minimize resistance thereof to air flow and means defining recessed surfaces rearward of said forward surface; and at least one retaining clip means for retaining said mounting members in said predetermined positions, said at least one retaining clip means being generally U-shaped having a pair of vertical legs separated by a horizontal leg, each said vertical leg including engagement members registrable with said enlarged area, wherein one of said engagement members is registered with said enlarged area and longitudinally moved in said slit prior to said plural mounting members being placed in said predetermined positions and thereafter the other of said engagement members is registered with said enlarged area and longitudinally moved in said slit so that said horizontal leg seats in each said recess surface of said mounting members to retain said mounting members in said predetermined positions.

2. A carrier as in claim 1 wherein said mounting means includes:

first and second hook members each associated with a respective one of said opposing ends, each said first and second hook members at a first end thereof defining a hook for engaging a portion of the edge of the vehicle roof; and adjusting means interconnecting (a) a second end, opposite to said first end, of each said first and second hook member and (b) said at least one carrier member to permit adjustment of the distance between said first and second hook members to accommodate various size vehicle roofs.

3. A carrier as in claim 2 wherein said adjusting means includes:
first elongated flexible member fixed to said first hook member at said respective end thereof, said first flexible member having at least one projection; and
second elongated flexible member fixed to said second hook member at said respective second end thereof, said second flexible member defining plural axially spaced apart apertures registrable with said at least one projection, wherein registration of one of said apertures with said at least one projection determines the separation distance between said first and second hook members.

4. A carrier as in claim 3 wherein said first flexible member includes second adjusting means for further adjusting the distance between said hook members, said second adjusting means including first and second opposing threaded portions and sleeve means threadably engaged with said first and second threaded portions wherein manipulation of said sleeve means displaces said first and second threaded portions relative to one another to responsively further adjust the distance between said first and second hook members.

5. A carrier as in claim 2 wherein said adjusting means includes:
a first elongated flexible member connected to said first hook members at said respective second end thereof, said first flexible member defining a first threaded portion;
a second elongated flexible member fixed to said second hook member at said respective second end thereof, said second flexible member defining a second threaded portion; and
sleeve means threadably coupling said first and second threaded portions wherein manipulation of said sleeve means responsively displaces said first and second threaded portions relative to one another to adjust the distance between said first and second hook members.

6. A carrier as in claim 5 wherein said carrier member includes means defining a slot to permit access to said sleeve means.

7. a carrier as in claim 4 wherein said carrier member includes means defining a slot to permit access to said sleeve means.

8. A carrier as in claim 1 wherein said plural mounting members are each retained in said predetermined positions as to be in abutting contiguous relationship to adjacent ones of said mounting members.

9. A carrier as in claim 1 wherein adjacent ones of said plural mounting member define a space therebetween.

10. A carrier as in claim 2 wherein each said hook member includes pivot means permitting pivotal movement of each said hook member.

11. A carrier as in claim 1 further including a flexible body disposed between the vehicle roof and said one carrier member at least along the front and lateral sides thereof, said body including means defining a concave surface adjacent the roof to establish a suction force to aid in securing the carrier thereto.

12. A carrier as in claim 11 wherein said flexible body includes means defining a closed cavity for absorbing forces exerted against the carrier to prevent such forces from deforming the roof.

13. A carrier as in claim 1 further comprising a second carrier member, separated from said first carrier member.

14. A carrier as in claim 13 further comprising support means connected to and bridging said first mentioned and said second carrier members for supporting goods thereon.

15. A vehicle roof carrier for accommodating goods to be carried on the roof of a motor vehicle, said carrier comprising:
forward and rearward elongated carrier members each having upper and lower surfaces and opposing ends and adapted to being mounted transversely on the vehicle roof and separated from one another to support the goods carried thereon, each said forward and rearward carrier members including means defining a slit longitudinally extending between said opposing ends and having at least one enlarged area in communication with said slit;
mounting means associated with each said forward and rearward carrier members for mounting said forward and rearward members transversely on the vehicle roof;
plural mounting members each retained on said upper surface of at least said forward carrier member at predetermined positions, each said mounting member defining a convexly curved forward surface to minimize resistance thereof to air flow and means defining recessed surfaces rearward of said forward surface; and
at least one retaining clip means for retaining said mounting members in said predetermined positions, said at least one retaining clip means being generally U-shaped having a pair of vertical legs separated by a horizontal leg, each said vertical leg including engagement members registrable with said enlarged area, wherein one of said engagement members is registered with said enlarged area and longitudinally moved in said slit prior to said plural mounting members being placed in said predetermined positions and thereafter the other of said engagement members is registered with said enlarged area and longitudinally moved in said slit so that said horizontal leg seats in each said recess surface of said mounting members to retain said mounting members in said predetermined positions.

16. A carrier as in claim 15 wherein said mounting means includes:
first and second hook members each associated with a respective one of said opposing ends, each said first and second hook members at a first end thereof defining a hook for engaging a portion of the edge of the vehicle roof; and
adjusting means interconnecting (a) a second end, opposite to said first end of each said first and second hook members and (b) said at least one carrier member to permit adjustment of the distance between said first and second hook members to accommodate various size vehicle roofs.

17. A carrier as in claim 16 wherein said adjusting means includes:
first elongated flexible member fixed to said first hook member at said respective second end thereof, said first flexible member having at least one projection; and second elongated flexible member fixed to said second hook member at said respective second end thereof, said second flexible member defining plural axially spaced apart apertures each registrable with each at least one projection, wherein registration of one of said apertures with said at least one projection determines the separation distance between said first and second hook members.

18. A carrier as in claim 17 wherein said first flexible member includes second adjusting means for further adjusting the distance between said hook members, said second adjusting means including first and second opposing threaded portions and sleeve means threadably engaged with said first and second threaded portions wherein manipulation of said sleeve means displaces said first and second threaded portions relative to one another to responsively further adjust the distance between said first and second hook members.

19. A carrier as in claim 16 wherein said adjusting means includes:

a first elongated flexible member connected to said first hook member at said respective second end thereof, said first flexible member defining a first threaded portion;

a second elongated flexible member fixed to said second hook member at said respective second end thereof, said second flexible member defining a second threaded portion; and sleeve means threadably coupling said first and second threaded portions wherein manipulation of said sleeve means responsively displaces said first and second threaded portions relative to one another to adjust the distance between said first and second hook members.

20. A carrier as in claim 19 wherein each said forward and rearward carrier members includes means defining a slot to permit access to said sleeve means.

21. A carrier as in claim 19 wherein each said forward and rearward carrier members includes means defining a slot to permit access to said sleeve means.

22. A carrier as in claim 15 wherein said plural mounting members are each retained in said predetermined positions so as to be in abutting contiguous relationship to adjacent ones of said mounting members.

23. A carrier as in claim 15 wherein adjacent ones of said plural mounting members define a space therebetween.

24. A carrier as in claim 16 wherein each said hook member includes pivot means permitting pivotal movement of each said hook member.

25. A carrier as in claim 15 further including a flexible body disposed between the vehicle roof and each said forward and rearward carrier members at least along the front and lateral sides thereof, said body including means defining a concave surface adjacent the roof to establish a suction force to aid in securing the carrier thereto.

26. A carrier as in claim 25 wherein said flexible body includes means defining a closed cavity for absorbing forces exerted against the carrier to prevent such forces from deforming the roof.

27. A vehicle roof carrier for accommodating goods to be carried on the roof of a motor vehicle, the roof having solid zones along the lateral edges thereof, said carrier comprising a pair of carrying elements spaced apart relative to one another, each of said carrying elements resting upon the roof transversely between the solid zones thereof, and means for fixing each said carrying element to the motor vehicle roof, wherein each said carrying element includes a base element of aerodynamically sound configuration to reduce air resistance during movement of the motor vehicle, carrying attachment means of an aerodynamically sound configuration longitudinally fixed to said base element and including means for accommodating said goods carried thereon, said base element and including rubber strip means disposed between the base element and the roof, said rubber strip means enclosing at least the front and lateral edges of the base element to establish a tight relationship therewith for transferring forces established by the goods to the solid zones of the motor vehicle roof, wherein said rubber strip means includes (a) means defining a concave surface adjacent to the roof to establish a suction force to aid in securing the carrier thereto, and (b) means defining a closed cavity for absorbing forces exerted against the carrier to prevent such forces from deforming the roof.

* * * * *